(12) United States Patent
Dear

(10) Patent No.: US 8,157,485 B2
(45) Date of Patent: Apr. 17, 2012

(54) SHUTTLE AND COMPONENT FEEDING SYSTEM

(75) Inventor: Aiden Robert Dear, Hertfordshire (GB)

(73) Assignee: Avdel UK Limited, Welwyn Garden, Hertfordshire (GB)

( * ) Notice: Subject to any disclaimer, the term of this patent is extended or adjusted under 35 U.S.C. 154(b) by 139 days.

(21) Appl. No.: 11/995,289

(22) PCT Filed: Aug. 21, 2006

(86) PCT No.: PCT/GB2006/003121
§ 371 (c)(1),
(2), (4) Date: Jan. 29, 2008

(87) PCT Pub. No.: WO2007/023265
PCT Pub. Date: Mar. 1, 2007

(65) Prior Publication Data
US 2008/0193230 A1 Aug. 14, 2008

(30) Foreign Application Priority Data
Aug. 20, 2005 (GB) .................................. 0517102.0

(51) Int. Cl.
*B65G 51/18* (2006.01)
(52) U.S. Cl. ....................................... 406/191; 406/184
(58) Field of Classification Search .................. 406/184, 406/186, 190, 191, 181, 182, 183, 110, 111, 406/112, 108, 73, 74; 221/278
See application file for complete search history.

(56) References Cited

U.S. PATENT DOCUMENTS

| | | | | |
|---|---|---|---|---|
| 1,898,860 A | * | 2/1933 | Underwood et al. | 406/34 |
| 1,965,933 A | * | 7/1934 | Taisey | 406/8 |
| 2,004,134 A | * | 6/1935 | Ross | 406/188 |
| 2,912,066 A | * | 11/1959 | Ellithorpe | 186/37 |
| 3,331,569 A | * | 7/1967 | Kelley | 406/188 |
| 3,601,337 A | * | 8/1971 | Bullock et al. | 406/28 |

(Continued)

FOREIGN PATENT DOCUMENTS
DE   199 08 048   8/2000
(Continued)

OTHER PUBLICATIONS

Combined Search and Examination Report under Sections 17 & 18(3) for Great Britain Application No. 0517102.0; Two (2) pages.

(Continued)

*Primary Examiner* — Gene Crawford
*Assistant Examiner* — William R Harp
(74) *Attorney, Agent, or Firm* — Hahn, Loeser & Parks LLP; Arland T. Stein

(57) ABSTRACT

A shuttle (11) for feeding tubular rivets (12), which are of relatively short axial length compared with their head diameter, along a flexible hose (26) to a movable rivet-installation tool has an aperture (18) running parallel to its axis along its whole length. Through this aperture a rivet can be both inserted into, and removed from, the shuttle. It also enables the sideways removal from the shuttle of an elongated mandrel, over the end of which a rivet has been axially fed. The exterior of the shuttle (11) and the interior of the hose (26) have similar cross-sections, which are a sliding fit and which co-operate with each other to maintain the shuttle (11) in a pre-determined rotational relationship with the hose (26), to facilitate insertion and removal of the rivet as aforesaid.

34 Claims, 6 Drawing Sheets

U.S. PATENT DOCUMENTS

| | | | |
|---|---|---|---|
| 3,690,593 A * | 9/1972 | Kettering | 406/186 |
| 3,829,042 A * | 8/1974 | Torochkov et al. | 406/182 |
| 4,245,934 A * | 1/1981 | Hinchcliffe et al. | 406/62 |
| 4,620,577 A * | 11/1986 | Nordenswan | 141/98 |
| 4,643,344 A | 2/1987 | Kaita et al. | |
| 5,092,714 A * | 3/1992 | Porter et al. | 406/186 |
| 6,015,246 A * | 1/2000 | Yamane et al. | 406/184 |
| 6,105,752 A * | 8/2000 | Liebich et al. | 198/747 |
| 6,575,347 B2 | 6/2003 | Coonrod et al. | |
| 7,418,774 B2 * | 9/2008 | Joseph et al. | 29/434 |
| 7,735,218 B2 * | 6/2010 | Bouman | 29/809 |

FOREIGN PATENT DOCUMENTS

| | | |
|---|---|---|
| GB | 1 323 530 | 7/1973 |
| GB | 2 338 764 | 12/1999 |
| JP | 60102321 | 6/1985 |

OTHER PUBLICATIONS

Examination Report under Section 18(3) for Great Britain Application No. 0517102.0; Three (3) pages.

* cited by examiner ial Application No. PCT/GB2006/003121, filed on Aug. 21, 2006. International Application No. PCT/GB2006/003121 relies upon British Application No. 0517102.0, filed on Aug. 20, 2005, for priority.

SHUTTLE AND COMPONENT FEEDING SYSTEM

RELATED/PRIORITY APPLICATION

This application is a National Phase filing regarding International Application No. PCT/GB2006/003121, filed on Aug. 21, 2006. International Application No. PCT/GB2006/003121 relies upon British Application No. 0517102.0, filed on Aug. 20, 2005, for priority.

BACKGROUND OF THE INVENTION

The invention relates to a shuttle for use in repeatedly feeding components, along a guideway for guiding the shuttle, from a component supply means to a component receiving means. For example, such a shuttle may be used for repeatedly feeding fasteners, such as tubular rivets, from a fastener supply means to a fastener receiving means, which fastener receiving means is associated with a fastener installation or placing means.

BRIEF SUMMARY OF THE INVENTION

The invention provides, in one of its aspects, a shuttle.

The invention further provides a component feeding system incorporating a shuttle as aforesaid.

A specific embodiment of the invention will now be described by way of example. This example shuttle and feeding system are intended to overcome a problem in the continuous feeding of tubular blind rivets of a relatively short length to a rivet placing tool. One example of such a blind rivet is that commercially available under the name BRIV (Registered Trade Mark). Essentially each rivet comprises a unitary tubular metallic structure having a tubular body and an externally radially enlarged head at one end thereof. In use the placing tool must be readily movable, and it is known to feed such rivets to a placing tool along a flexible hose by means of an air stream along the hose, the internal diameter of the hose providing an appropriate clearance around the head of the rivet. One such system is commercially available under the trademark RIVMATIC 360 (RIVMATIC is a Registered Trade Mark). The placing tool includes an elongated mandrel with an enlarged head at the remote end which is pulled through each rivet in turn to place it. Each rivet must be fed on to the nearer tail end of the mandrel with the tail end of rivet first and its head end last. Hence the rivets must be fed tail end first through the flexible hose. This works in practice with rivets which are axially relatively long in comparison with their head diameter. However it is found that shorter rivets tend to jam in the hose. Specifically, if the length of the rivet is no more than about 1.2 times the diameter of its head, the rivet twists sideways about a diametral line of its head and jams across the hose.

BRIEF DESCRIPTION OF THE DRAWINGS

The example to be described below is intended to overcome this problem. It will be described with reference to the accompanying drawings, in which:—

DETAILED DESCRIPTION OF EMBODIMENTS OF THE INVENTION

Figure 1A:
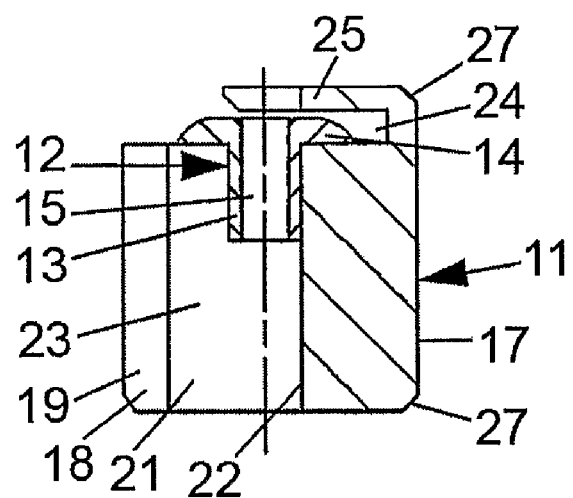
FIG. 1A shows the shuttle, and a rivet received therein, in axial section.
Figure 1B:
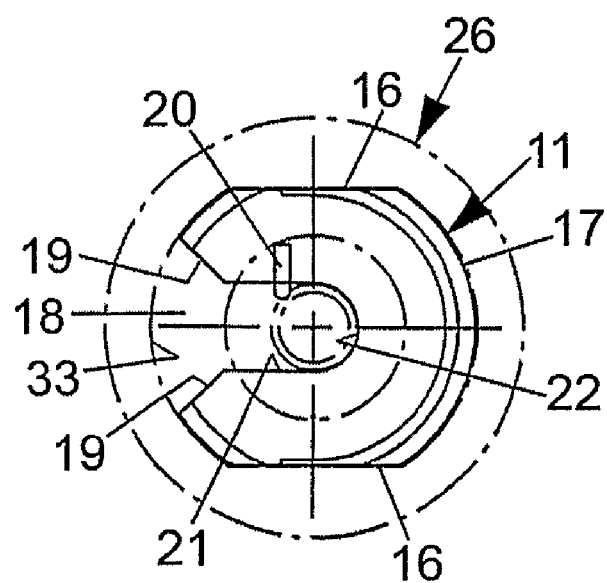
FIG. 1B shows the shuttle of FIG. 1A in plan, the rivet being shown in ghost for clarity of illustration, and the tube providing the guideway being shown in section.

Referring first to FIGS. 1A and 1B, the shuttle 11 is used to receive and transport a tubular rivet 12 having a cylindrical body 13 with a radially enlarged head 14 and a cylindrical bore 15 running completely through its length. In this example the total axial length of the rivet is shorter than the diameter of the head 14, by a factor of about 0.7. The shuttle has an exterior cross-section as shown in FIG. 1B, having two opposed parallel flat faces 16, 16 joined by two arcuate faces 17, 17 which are parts of the same circle. The shuttle has an aperture 18, running its whole length, down the middle of one of the arcuate walls 16. The outermost end part of the aperture has two angled walls 19, leading to two parallel walls 21, 21 spaced apart appropriately to allow the rivet body 13 to pass between them. The inner ends of the walls 21 merge into opposite sides of a semi-cylindrical wall 22, of appropriate diameter to receive half of the rivet body 13. It will be apparent that these walls define a space 23 for receiving, containing and allowing removal of the rivet body 13. Near the upper end of the shuttle (as illustrated in FIG. 1A) the aperture 18 and the space 23 are radially enlarged at 24 to allow reception of the enlarged head 14 of the rivet. Above the head space 24 the topmost part 25 of the shuttle body provides a lip for axial retention of the rivet in the shuttle. A sprung detent 20 provides radial retention of the rivet in the shuttle. It will be apparent that the aperture 18 allows insertion of the rivet into the shuttle, and also its later removal therefrom.

The guideway for the shuttle comprises a flexible hose of suitable material, for example nylon or polyurethane. Its exterior is conveniently of circular cross-section, but its interior bore 33 corresponds in section to the exterior sectional shape of the shuttle 11. Thus it has two opposed flat faces and two opposed arcuate faces. There is a small clearance between the shuttle exterior and the hose bore, sufficient to allow free passage of the shuttle along the bore. The material of the hose is chosen to have a low surface friction (and a lubricant may be used), and each end of the shuttle 11 has a bevel or chamfer 27 to assist its free passage along the hose.

The co-operation between the corresponding non-circular sectional shapes of the shuttle and hose bore ensures that the rotational orientation of the shuttle aperture 18 with respect to the bore is always pre-determined. This enables the provision of a rivet insertion station and a rivet removal station, spaced apart along the hose 26 and both in fixed relationship to it.

Figure 2:
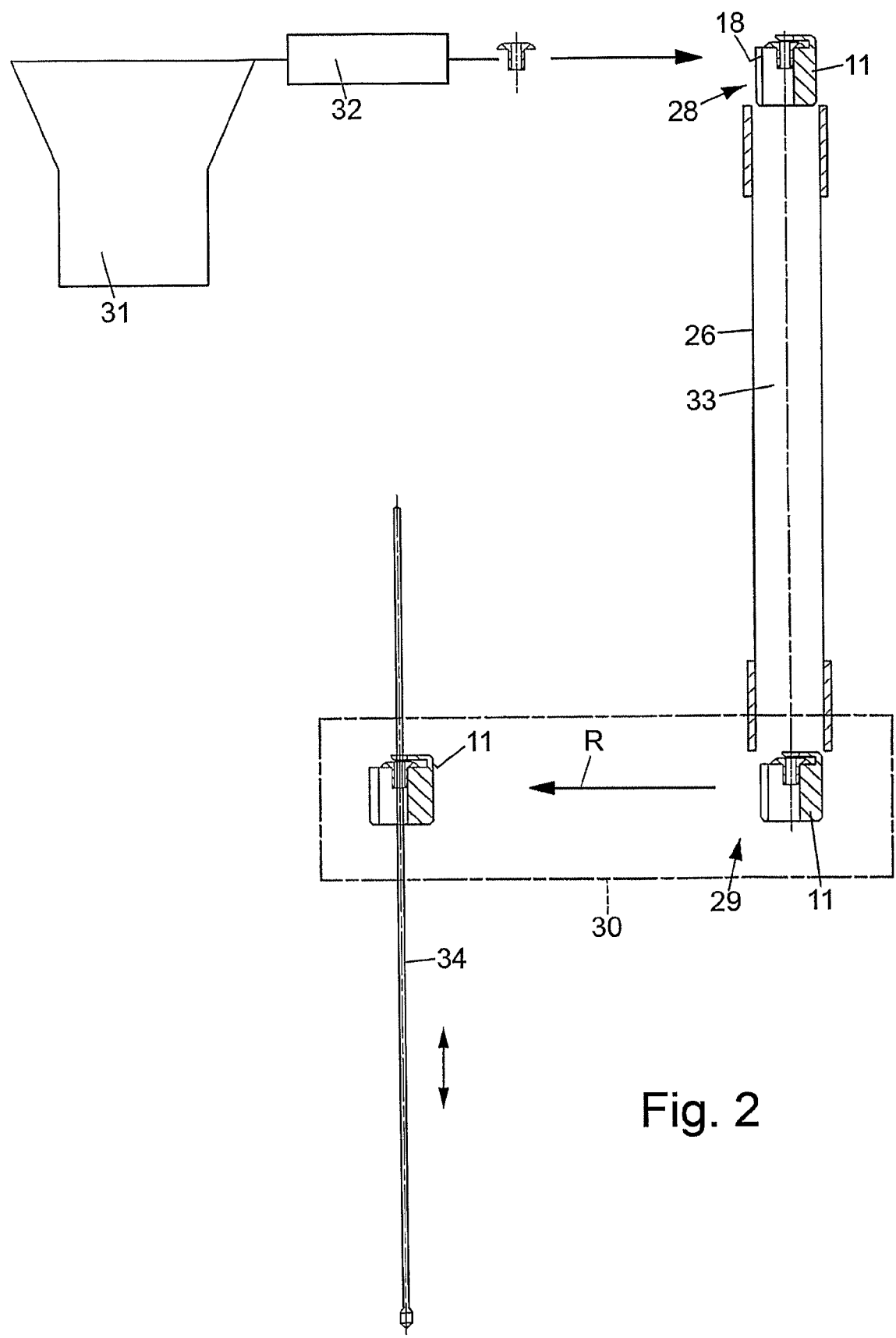
FIG. 2 illustrates schematically the function of the guideway part of the system.

This is shown in simplified schematic form in FIG. 2. The hose 26 has at one end a rivet insertion station 28 and at the other end a rivet removal station 29, the rivet being both inserted into and removed from the shuttle through the aperture 18 in a direction radially of the hose and in a fixed position circumferentially of the hose. Rivets are fed from a vibratory bowl-feeder 31 of well-known type, to a rivet alignment and feeding device 32. This latter feeds the rivet through the aperture 18 of the shuttle when the latter is positioned at the insertion station 28. The bowl feeder 31 operates continuously to feed a continuous queue of rivets towards the feeding device 32. When this latter is actuated by the pneumatic system, it feeds a rivet to the insertion station 28. This incorporates a pneumatically actuated finger (or possibly a pair of jaws) which pushes the rivet through the slot 18 with sufficient force to overcome the sprung detent 20 which then retains the rivet 13 centrally within the shuttle 11, as illustrated in FIGS. 1A and 1B. The shuttle, with the rivet in it, is driven by an air blast along the hose 26 to the removal station 29. Here the shuttle is moved laterally, by means of an air-actuated transfer device 30, from the end of the hose as indicated by the arrow R to a position in which the rivet bore 15 is in axial alignment with the tail end of the placing tool mandrel 34, which in use of the tool oscillates axially. The sprung detent 20 holds the rivet 13 against the shuttle wall 22 with its bore 15 in the correct position. When the tail end of the mandrel has entered the rivet bore 15 and emerged from the other end, as is illustrated in FIG. 2, the shuttle is moved back in the opposite direction, to its original position. Thus the rivet 11 and mandrel 34 are removed from the shuttle through the aperture 18, the rivet having been fed on to the tail end of the mandrel 34. The rivet is fed along the mandrel by the action of the placing tool. There will normally be a number of rivets accumulated on the body of the mandrel.

Figure 3:
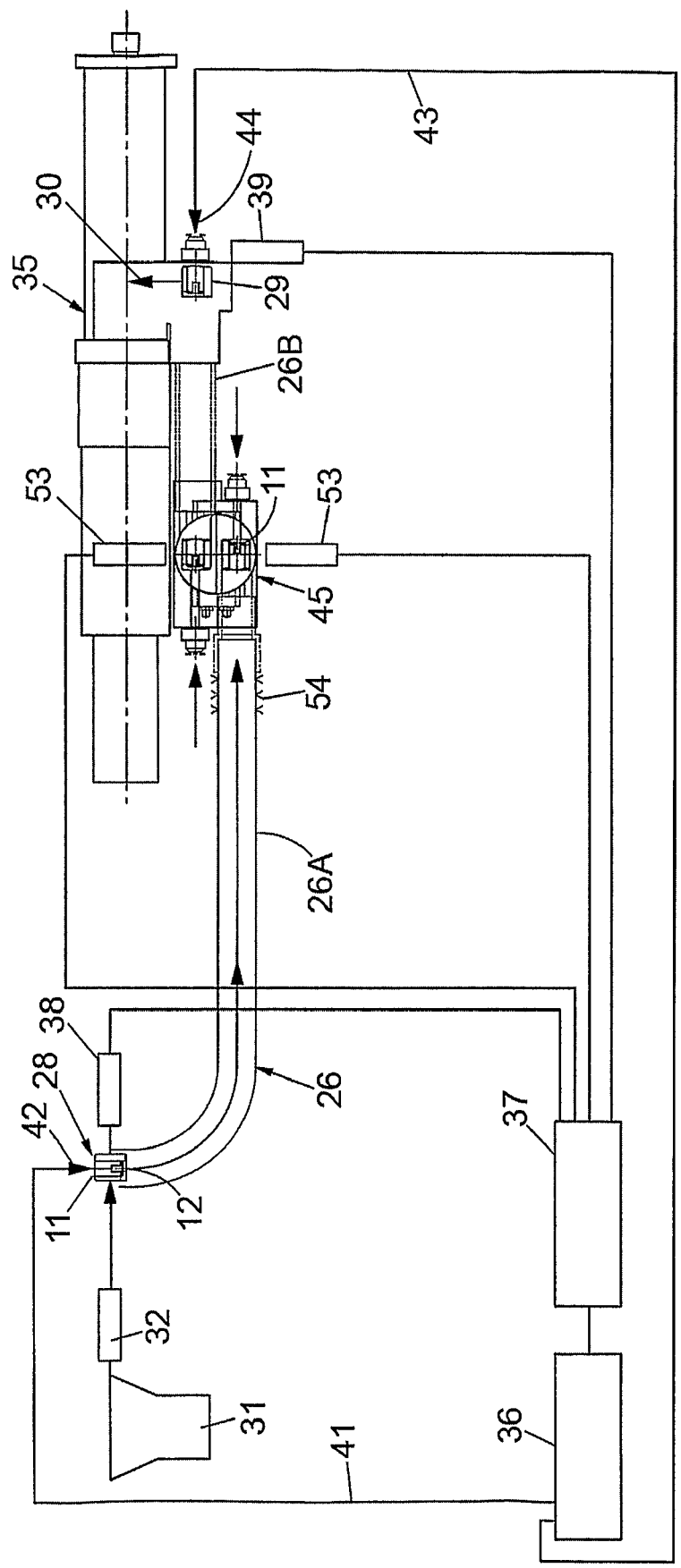
FIG. 3 illustrates schematically the various parts of the system in working relationship to each other, with a two-shuttle system.

FIG. 3 illustrates schematically the various parts of the system. In addition to the features already mentioned, the system includes a hydro-pneumatically operated rivet placing tool 35, on which is mounted the rivet removal station 29; a pneumatic power source 36 for generating compressed air to activate various parts of the system; an electronic control device 37 for controlling the pneumatic source 36; and various sensors, connected to the control device 37, for detecting the positions or states of various components of the system. Specifically, they include an insertion station through beam sensor 38 which detects when the shuttle 11 is at the insertion station, and a removal station sensor 39 that detects when the shuttle 11 is at the removal station 29. The system also includes a feed air pipe 41 to feed an air blast to an output 42 to drive the shuttle along the hose 26 towards the placing tool 35, and similarly a return air pipe 43 to feed an air blast to an output 44 to drive the shuttle in the reverse direction.

It will be appreciated that the use of a single shuttle to feed rivets one at a time along the hose 26 to the placing tool 35 restricts the frequency at which successive rivets can be supplied to the tool, because of the time taken to feed the shuttle both ways along the length of the hose, and to move the loaded shuttle at the removal station across to the tool mandrel and back again. It may be that in some applications successive rivets cannot be fed to the placing tool as frequently as required, thereby restricting the speed of use of the tool. It would be possible to use two parallel hoses, each carrying its own shuttle, with the system arranged to feed rivets into each shuttle alternately, with one shuttle returning empty to the insertion station whilst the other is carrying a rivet towards the removal station. However the use of two hoses together would have the disadvantage of being less flexible and thereby making the tool less easy to move around between the required positions to install successive rivets in a workpiece.

In order to overcome this problem, the present system uses only a single hose with two shuttles, one shuttle being returned empty along the hose whilst at the same time the other shuttle is at the removal station and its rivet is being removed and fed over the end of the riveting tool mandrel. Referring to FIG. 3, the hose 26 comprises a first part 26A extending from the insertion station 28 to an interchange station 45 attached to the riveting tool 35, and a second, much shorter, part 26B extending from the interchange station 45 to the removal station 29. The interchange station is shown on a larger scale in FIG. 4. It comprises a body 46 having a first chamber 47 to one end of which is connected the end of the first part 26A of the shuttle feed hose, and parallel to it a second chamber 48, to that end of which is remote from the hose part 26A is connected the second part 26B of the hose leading to the rivet removal station 29. The first chamber has, at its end remote from the hose 26A, an air connector 49 to which is connected an air pipe (not shown) for supplying a blast of air through the chamber 47 and pipe 26A to return an empty shuttle along the pipe 26A to the insertion station 28. Likewise the second chamber 48 has, at its end remote from the hose 26B, an air connector 51 to which is connected an air pipe (not shown) for supplying a blast of air through the chamber 48 and pipe 26B to feed a full shuttle to the rivet removal station 29.

Figure 4:
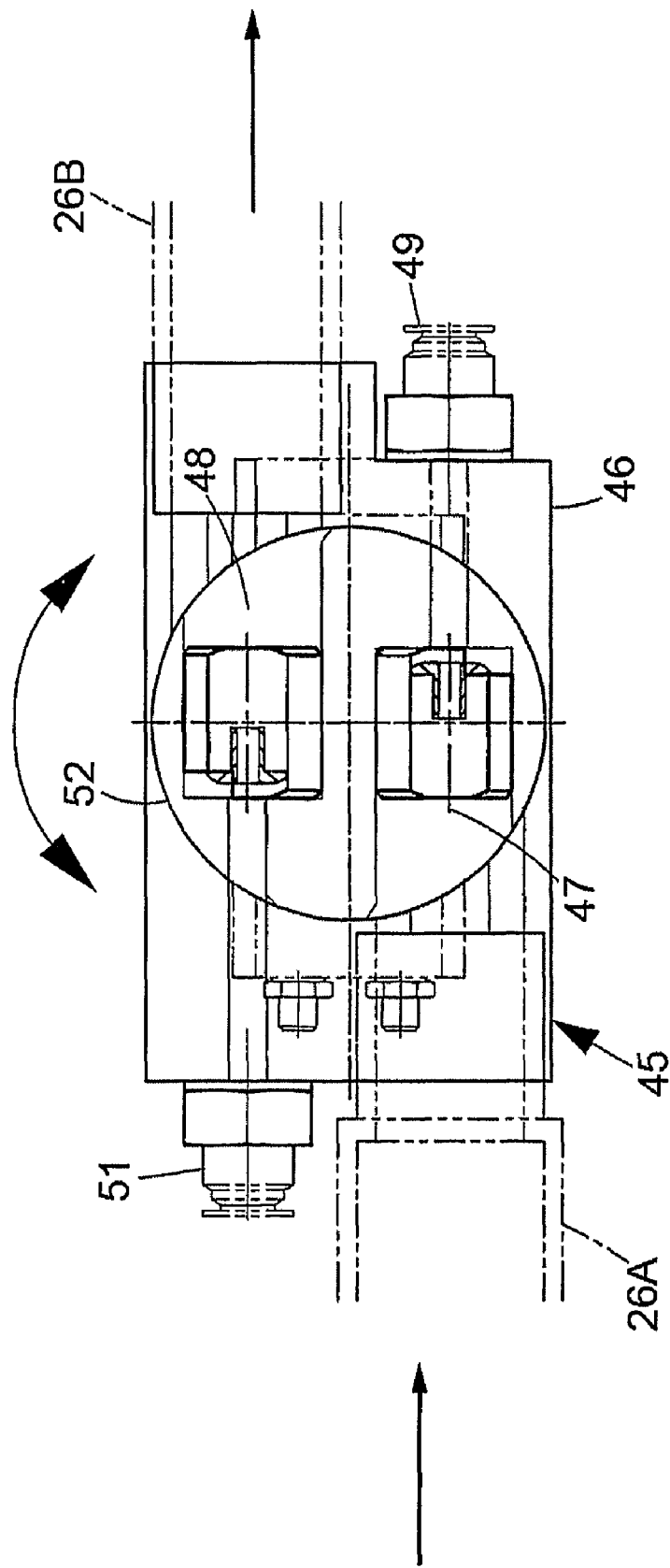
FIG. 4 shows on an enlarged scale the shuttle interchange station of FIG. 3.

The two shuttles are interchanged between chambers 47 and 48 by means of a rotatable carrier 52. This has a circular exterior received within a circular recess in the body 46, extending into and in fact providing large parts of both chambers 47 and 48. When there is a shuttle in both parts of the carrier 52 (as illustrated in FIG. 4), rotation of the carrier through 180 degrees will interchange the shuttles. Both shuttles turn through 180 degrees, and hence reverse the direction in which each is facing. Since the shuttle in the second part 26B of the hose must carry its rivet tail first, to be fed over the tail end of the placing tool mandrel as described above, the shuttle in the main part 26A of the hose must carry the rivet head first. The rivet insertion station 28 is of course arranged to do this, as illustrated at 28 in FIG. 3.

It must be explained that although the system contains only two shuttles, FIG. 3, by way of illustration, shows shuttles (each containing a rivet) in four positions: one in the insertion station 28, one in the removal station 29, and two in the interchange station 45. In actual operation of the system, only one of the shuttles 11 at the interchange station 45 will contain a rivet.

The system also includes a number of sensors which are not illustrated in the accompanying drawings. All of these, as well as the ones which are shown in the drawings, are connected to the control system 37 which is programmed to read all the sensors' outputs and to control the pneumatic system 36 accordingly to operate all elements of the rivet supply system accordingly, as will be described later. Thus, the rivet insertion station 28 is provided with a proximity sensor to detect when a shuttle has arrived at the station. The rivet placing tool 35 is provided with a magnetic reed sensor to detect when the rivet tool mandrel 34 is (or is not) in its rearward position. Moreover the placing tool 35 is provided with full sequential control, which ensures that the position of every moving component and assembly on the tool is sensed, including for example the shuttle delivery, and insertion of a rivet in the shuttle, as and when appropriate.

Actuation of the interchange station 45, to rotate the container 52 through 180 degrees, is achieved by means of a pneumatically powered actuator (not shown). Sensors 53 connected to the control box 37 are provided at the interchange station to detect the position of the container.

It will be appreciated that the shuttle 11 is fed along the hose 26A at high speed, by the air blast fed into the hose. In order to reduce the impact of the shuttle on the interchange station structure and the placing tool to which it is attached, means to decelerate the shuttle as it approaches the interchange station is provided by a number of vent holes 54 in the hose 26A adjacent its connection to the interchange station.

The function of the system will now be described, with reference to FIGS. 3 and 4, by following the movement of one shuttle from the rivet insertion station 28 to the rivet removal station 29, and back again.

The presence of the empty shuttle at the insertion station 28 is detected by the aforementioned proximity sensor (not shown), and this output signal is detected by the control system 37 which is programmed to then actuate the pneumatic system 36 to actuate the feeding device 32 to feed a rivet into the shuttle. When the through beam detector (not shown) detects the presence of the rivet in the shuttle, the control system 37 actuates the pneumatic system 36 to send an air blast through air pipe 41 to the shuttle feed air output 42. This propels the loaded shuttle forwards along the hose 26A and into the first chamber 47 of the interchange station, which chamber is empty. When the exchange sensors 53, 53 detect that there is a shuttle in both of the interchange station chambers 47 and 48, they actuate the control system to operate the interchange station 45 and rotate the rotatable chamber 52 through 180 degrees, thereby interchanging the loaded shuttle in the first chamber 47 and the empty shuttle in the second chamber 48. When the sensors 53, 53 detect that this interchange is complete, they actuate the control system 37 to operate the pneumatic system 36 to shut off the air blast from the shuttle feed output 42, and to apply an air blast to the connector 51 to feed the loaded shuttle forwards along the hose 26B to the rivet removal station 29. When the sensor 39 detects the presence of the shuttle at the rivet removal station 29, the pneumatic system 36 operates the transfer 30 to move the shuttle sideways so that the rivet bore 15 is aligned with the axis of the placing tool mandrel 34, which is held by the tool control system (after being retracted sufficiently to install its foremost rivet) in an intermediate position, to allow the shuttle transfer device to position the shuttle as just described. When it is detected that the shuttle is in the correct position, the control system actuates the placing tool to complete the rearwards movement of the mandrel 34, so that its tail passes into and through the rivet bore 15, as illustrated in FIG. 2. When it is detected that the mandrel is in this position, the control system actuates the transfer device 30 to return the shuttle into alignment with the hose 26B with sufficient force to overcome the sprung detent 20, leaving the rivet on the end of the mandrel, along which it is fed forwardly by the tool. When the sensor 39 detects that the empty shuttle is in alignment with hose 26B, and the interchange station sensors 53, 53 detect that the other shuttle (carrying a rivet) is within the first chamber 47 of the interchange station 45, an air blast is applied to the return air output 44 to propel the empty shuttle back along hose 26B and back into the second chamber 48 of the interchange station. When the presence of this empty shuttle in the second chamber is detected, as well as the presence of a full shuttle in the first chamber 47, is detected, the control system 37 actuates the pneumatic system 36 to rotate the container 52 through 180 degrees in the reverse direction to previously. Thus the empty shuttle is now aligned with hose 26A. When the rotation sensors 53, 53 detect that the container 52 is appropriately aligned, an air blast is applied to the connector 49 to propel the empty shuttle back along hose 26A to return the shuttle to the insertion station 28. (Alternatively the empty and full shuttles may be fed to the chambers 47 and 48 at the same time, rather than sequentially as described above, thus speeding up the tool operation sequence).

The cycle of operations then starts again.

Figure 5A:
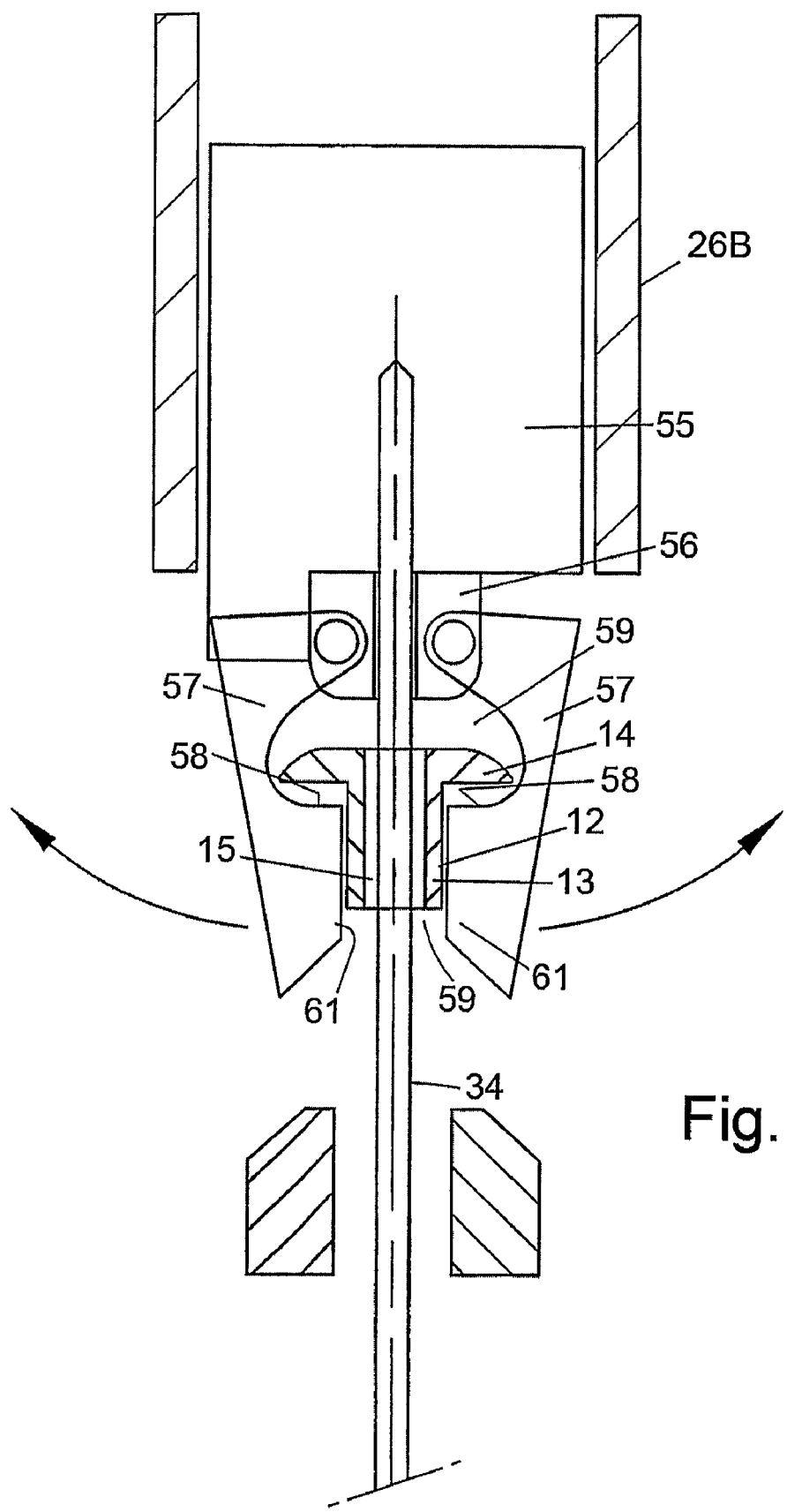
FIGS. 5A and 5B show, partly in axial section, an alternative form of shuttle.
Figure 5B:
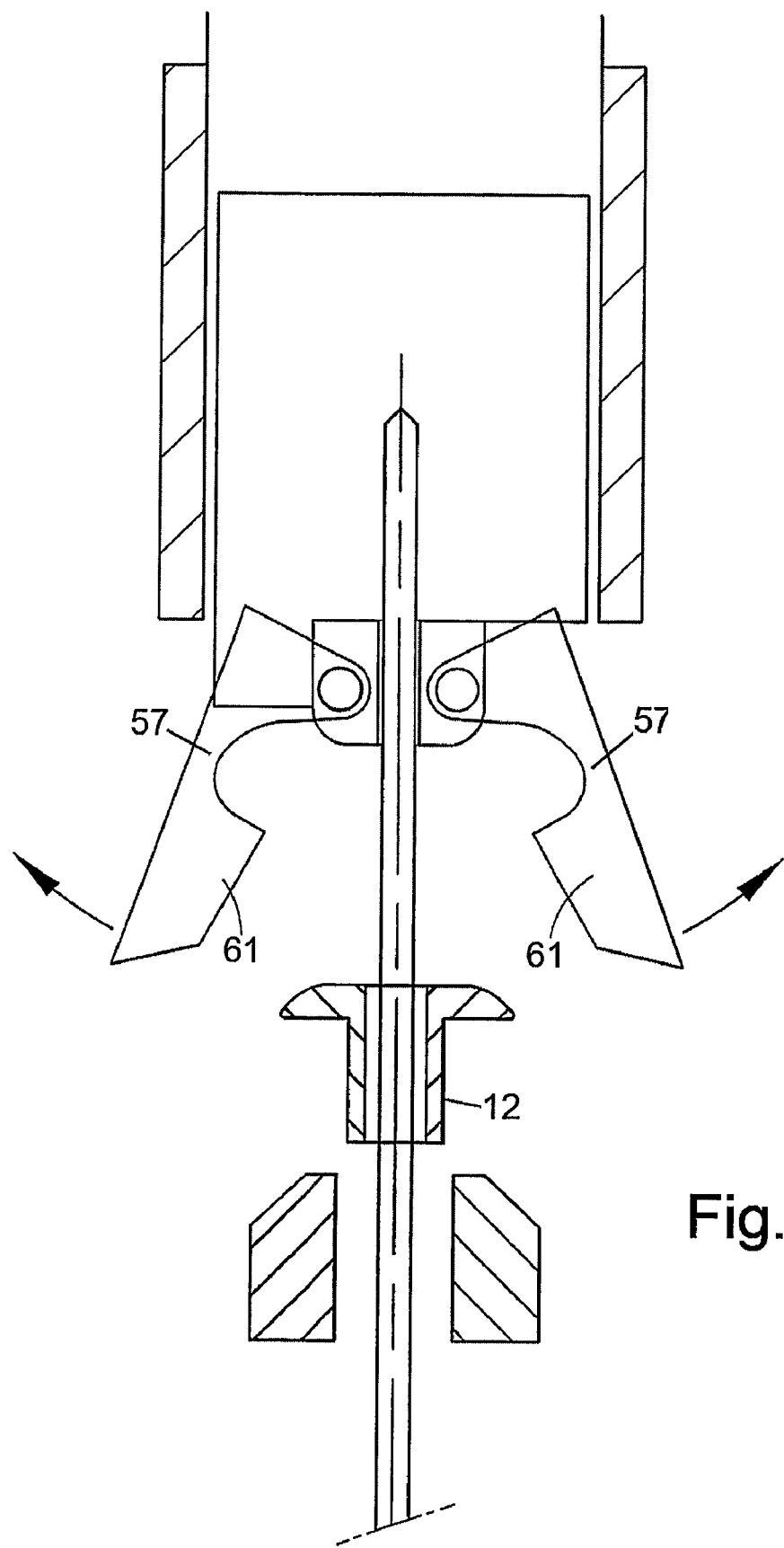

An alternative form of shuttle is illustrated in FIGS. 5A and 5B, both of which show the shuttle at the removal station 29 at the end of hose 26B. This has releasable rivet retaining means which is actuatable to release a rivet to enable removal thereof from the shuttle in an axial direction instead of a transverse direction. However the rivet is still inserted into the shuttle in a transverse direction. The shuttle has a body 55 with an axially projecting lug 56 on which are pivoted two segments 57, 57 which effectively form rivet-retaining fingers, which are urged together by spring means (not shown). The segments have mutually facing profiles 58, 58 such that, when closed towards each other as shown in FIG. 5A, they define a transverse passage 59 into which a rivet can be inserted transversely whilst being retained from axial removal by the projecting parts 61, which close around the rivet body 13 and engage under the rivet head 14. When the two segments 57, 57 are pivoted away from each other (by means not shown), as illustrated in FIG. 5B, the two parts 61, 61 move sufficiently far apart from each other to allow axial removal of the rivet 12 from the shuttle. As illustrated in FIG. 5A, this enables the shuttle 55 to be axially aligned with the placing tool mandrel 34, which enters the bore of the rivet (as in the previous example. The shuttle body 55 is provided with an appropriate cavity to receive the end part of the tool mandrel 34. The pivotal segments 57, 57 are then moved apart to release the rivet 11 (see FIG. 5B), and the empty shuttle removed axially.

This form of shuttle removes the need for a lateral transfer device 30 in the previous example, and much simplifies the design and operation of the rivet removal station 29.

The invention is not restricted to the details of the foregoing examples. For instance, in the example illustrated in FIG. 3, the interchange system illustrated in FIG. 4 may be constructed and arranged so that the rotatable container 52 rotates about an axis parallel to, and positioned intermediate between, the axes of the two chambers 47 and 48. Since the shuttle would then not be reversed in direction by the interchange station, the insertion station 28 would be arranged to feed the rivet to travel tail-first.

The invention claimed is:

1. A shuttle for use in repeatedly feeding components along a guideway, the shuttle comprising:
    a shuttle body having a first end and a second end opposite the first end in an axial direction, the shuttle body also having side portions, at least a part of the side portions extending between the first end and the second end and defining an exterior cross section comprising at least one arcuate portion and at least one non-arcuate portion to orient the shuttle within the guideway;
    a first aperture extending through the first end and the second end of the shuttle body in the axial direction, where the first aperture is configured to substantially align with an axially extending aperture of a component;
    a component retainer adapted to receive the component from a direction lateral from the axial direction and retain the component in axial alignment with the first aperture of the shuttle while the shuttle is moved along the guideway.

2. The shuttle as claimed in claim 1, the component retainer further comprising:
    pivotable segments extending from the shuttle body in the axial direction,
    the pivotable segments being movable between a first position and a second position, the first position adapted to inhibit axial removal of the component while the shuttle is moving along the guideway and the second position adapted to permit axial removal of the component from the shuttle.

3. The shuttle as claimed in claim 2, where the pivotable segments include a passage adapted to receive a component from the lateral direction.

4. The shuttle as claimed in claim 1, the shuttle further comprising:

a second aperture disposed in a side portion of the shuttle body and extending to the first aperture, where the second aperture is adapted to receive a component from the lateral direction.

5. The shuttle as claimed in claim 4, where the component retainer comprises a sprung detent adapted to retain the component with the shuttle while the shuttle is moved along the guideway.

6. The shuttle as claimed in claim 4, the shuttle further comprising:
a second component retainer disposed at one end of the shuttle body adapted to restrain the component in the axial direction while the shuttle is moved along the guideway.

7. The shuttle as claimed in claim 4, where the component is a tubular rivet having a head portion and a body portion, and the second aperture further comprises a radially enlarged portion adapted to receive the head portion of the rivet.

8. The shuttle as claimed in claim 1, where the component is a tubular rivet having a head portion and a body portion and an axially extending bore through the rivet, and
where the component retainer is adapted to maintain the rivet bore in axial alignment with the first aperture of the shuttle.

9. A shuttle for use in repeatedly feeding rivets along a guideway to a mandrel, the shuttle comprising:
a shuttle body having a first end and a second end opposite the first end in an axial direction, the shuttle body also having side portions, at least a part of the side portions extending between the first end and the second end and defining an exterior cross section adapted to orient the shuttle within a guideway;
a first aperture extending through the first end and the second end of the shuttle body in the axial direction, where the first aperture is configured to substantially align with an axial bore extending through a rivet; and
a component retainer adapted to receive the rivet from a direction lateral from the axial direction and retain the rivet with the rivet bore in axial alignment with the first aperture of the shuttle while the shuttle is moved along the guideway.

10. The shuttle as claimed in claim 9, where the shuttle is further adapted to permit a mandrel to be extended through the rivet bore and the first aperture of the shuttle while the rivet is retained by the shuttle.

11. The shuttle as claimed in claim 10, where the shuttle is further adapted to be removed from the mandrel in an axial direction while leaving the rivet on the mandrel for use in a rivet placement system.

12. The shuttle as claimed in claim 10, where the shuttle is further adapted to be removed from the mandrel in a lateral direction while leaving the rivet on the mandrel for use in a rivet placement system.

13. The shuttle as claimed in claim 10, where the component retainer is further adapted to release the rivet from the shuttle after the mandrel has been placed through the rivet bore.

14. A component feeding system comprising:
a component insertion station and a component removal station disposed along a guideway, the component insertion station configured to insert a component into a shuttle from a direction lateral to a direction of travel of the shuttle in the guideway and the component removal station configured to remove a component from the shuttle;
a guideway having an interior bore with an interior cross section, where the guideway is adapted to guide a shuttle along the guideway between the component insertion station and the component removal station; and
at least one shuttle, where each shuttle comprises:
a shuttle body having a first end and a second end opposite the first end in an axial direction generally corresponding to the direction of travel of the shuttle in the guideway,
side portions defining an exterior cross section corresponding to the interior cross section of the guideway to orient the shuttle within the guideway, at least a part of the side portions extending between the first end and the second end; and
a first aperture extending through the first end and the second end of the shuttle body in the axial direction, where the first aperture is configured to substantially align with an axially extending aperture of the component, and
a component retainer adapted to receive the component from the component insertion station from the direction lateral to the direction of travel of the shuttle in the guideway and retain the component in alignment with the first aperture while the shuttle is moved along the guideway.

15. The component feeding system as claimed in claim 14, the shuttle further comprising:
pivotable segments extending from the shuttle in the axial direction of the guideway,
the pivotable segments being movable between a first position and a second position, the first position adapted to inhibit axial removal of the component while the shuttle is moving along the guideway and the second position adapted to permit axial removal of the component from the shuttle.

16. The component feeding system as claimed in claim 15, where the pivotable segments include a passage adapted to receive a component from the component insertion station from the direction lateral to the direction of travel of the shuttle.

17. The component feeding system as claimed in claim 14, the shuttle further comprising:
a second aperture disposed in one of the side portions of the shuttle body and extending to the first aperture, where the second aperture is adapted to receive a component from the component insertion station from the direction lateral to the direction of travel of the shuttle.

18. The component feeding system as claimed in claim 17, where the component retainer of the shuttle comprises a sprung detent adapted to retain the component with the shuttle while the shuttle is moved along the guideway from the component insertion station to the component removal station.

19. The component feeding system as claimed in claim 17, the shuttle further comprising:
a second component retainer disposed at one end of the shuttle body adapted to restrain the component in the axial direction while the shuttle is moved along the guideway from the component insertion station to the component removal station.

20. The component feeding system as claimed in claim 17, where the component is a tubular rivet having a head portion and a body portion, and the second aperture of the shuttle further comprises a radially enlarged portion adapted to receive the head portion of the rivet.

21. The component feeding system as claimed in claim 14, where the component is a tubular rivet having a head portion and a body portion and an axially extending bore through the rivet, and where the component retainer is adapted to maintain the rivet bore in axial alignment with the first aperture of the shuttle.

22. The component feeding system as claimed in claim 14 further comprising:
an air blast to drive the shuttle backwards and forwards along the guideway between the component insertion station and the component removal station;
a first sensor to detect when the shuttle is at the component insertion station;
a second sensor to detect when the shuttle is at the component removal station; and
a control system adapted to activate the driving of the shuttle between the component insertion station and the component removal station based on inputs received from at least one of the first sensor and the second sensor.

23. The component feeding system as claimed in claim 14 further comprising:
a shuttle interchange station along the guideway between the component insertion station and the component removal station,
where a loaded shuttled containing a component being driven from the component insertion station towards the component removal station and an unloaded shuttle being driven from the component removal station towards the component insertion station are interchanged at the shuttle interchange station.

24. The component feeding system as claimed in claim 14, where the guideway is further adapted to orient the shuttle at the component insertion station to receive a component from the direction lateral to the direction of travel of the shuttle.

25. The component feeding system as claimed in claim 14, where the guideway is further adapted to orient the shuttle at the component removal station to remove a component from the direction lateral to the direction of travel of the shuttle.

26. The component feeding system as claimed in claim 14, where the guideway is further adapted to orient the shuttle at the component removal station to remove a component from the axial direction.

27. A rivet feeding system comprising:
a rivet insertion station and a rivet removal station disposed along a guideway, the rivet insertion station configured to insert a rivet into a shuttle from a direction lateral to a direction of travel of the shuttle in the guideway and the rivet removal station configured to remove a rivet from the shuttle;
a guideway having an interior bore with an interior cross section, where the guideway is adapted to guide a shuttle along the guideway between the rivet insertion station and the rivet removal station; and
at least one shuttle, where each shuttle comprises:
a shuttle body having a first end and a second end opposite the first end in an axial direction generally corresponding to the direction of travel of the shuttle in the guideway,
side portions defining an exterior cross section corresponding to the interior cross section of the guideway to orient the shuttle within the guideway, at least a part of the side portions extending between the first end and the second end,
a first aperture extending through the first end and the second end of the shuttle body in the axial direction, where the first aperture is configured to substantially align with an axial bore extending through a rivet, and
a component retainer adapted to receive the rivet from the rivet insertion station from the direction lateral to the direction of travel of the guideway and retain the rivet with the rivet bore in alignment with the first aperture of the shuttle while the shuttle is moved along the guideway.

28. The rivet feeding system of claim 27, where the shuttle is adapted to permit a mandrel to be extended through the rivet bore and the first aperture of the shuttle while the rivet is retained by the shuttle.

29. The rivet feeding system as claimed in claim 28, where the component retainer is further adapted to release the rivet from the shuttle after the mandrel has been placed through the rivet bore.

30. The rivet feeding system of claim 27, where the rivet removal station further comprises a rivet placement tool having a mandrel.

31. The rivet feeding system of claim 30, where the shuttle is adapted to permit the mandrel of the rivet placement tool to be extended through the rivet bore and the first aperture of the shuttle while the rivet is retained by the shuttle.

32. The rivet feeding system as claimed in claim 31, where the shuttle is further adapted to be removed from the mandrel in the axial direction while leaving the rivet on the mandrel for use by the rivet placement tool.

33. The rivet feeding system as claimed in claim 31, where the shuttle is further adapted to be removed from the mandrel in the lateral direction while leaving the rivet on the mandrel for use by the rivet placement tool.

34. The rivet feeding system of claim 27, where the rivet insertion station comprises a vibratory bowl-feeder.

* * * * *

UNITED STATES PATENT AND TRADEMARK OFFICE
CERTIFICATE OF CORRECTION

PATENT NO.       : 8,157,485 B2
APPLICATION NO.  : 11/995289
DATED            : April 17, 2012
INVENTOR(S)      : Aiden Robert Dear It is certified that error appears in the above-identified patent and that said Letters Patent is hereby corrected as shown below:

IN THE CLAIMS:

Column 8, line 12, "end; and" should read --end,--.

Column 8, line 27, "direction of the guideway" should read --direction--.

Signed and Sealed this
Thirty-first Day of July, 2012

David J. Kappos
*Director of the United States Patent and Trademark Office*